United States Patent

[11] 3,533,395

| [72] | Inventor | Edward E. Yaste<br>Burlingame, California |
|---|---|---|
| [21] | Appl. No. | 752,048 |
| [22] | Filed | Aug. 12, 1968 |
| [45] | Patented | Oct. 13, 1970 |
| [73] | Assignee | Stanray Corporation<br>Chicago, Illinois<br>a corporation of Delaware |

[54] AIRCRAFT DEICER SYSTEM AND APPARATUS
5 Claims, 6 Drawing Figs.

[52] U.S. Cl. .................................................. 126/271.1, 134/45
[51] Int. Cl. ..................................................... B60s 3/00
[50] Field of Search ............................................ 126/271.1; 134/45, 123; 15/302; 244/134, 134(C)

[56] References Cited
UNITED STATES PATENTS

| 1,720,140 | 7/1929 | O'Connor | 244/134(C)UX |
| 2,457,031 | 12/1948 | Campbell et al. | 244/134(C)UX |
| 3,088,472 | 5/1963 | Haines | 134/123X |
| 3,378,018 | 4/1968 | Lawter | 134/123X |

*Primary Examiner* — Charles J. Myhre
*Attorney* — Townsend and Townsend

ABSTRACT: This is an aircraft deicing apparatus in which a pair of elongate booms carrying spray nozzles are mounted on columns alongside an aircraft parking area. An operator's control station is carried on one of the booms near one end to give the operator a clear view of the aircraft being sprayed. The deicing system includes a collecting system for salvaging sprayed deicing fluid, means to clean the fluid, to restore the proper proportion of components, and to heat the fluid prior to its being pumped to the boom nozzles.

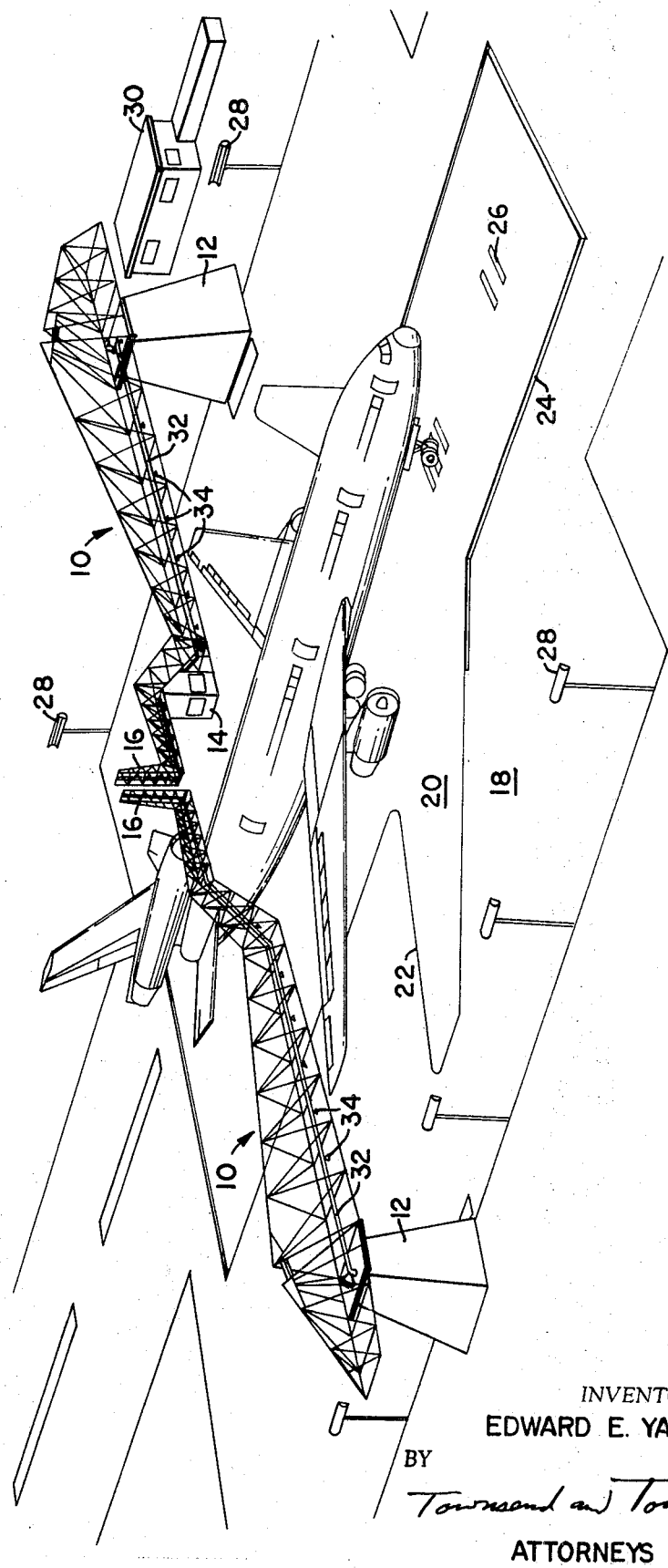
FIG_1
INVENTOR.
EDWARD E. YASTE
BY
Townsend and Townsend
ATTORNEYS

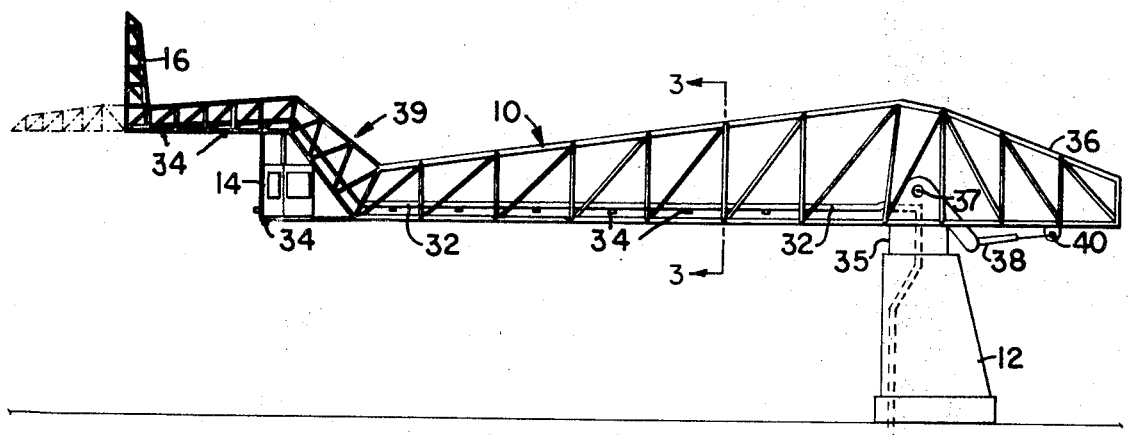
FIG_2
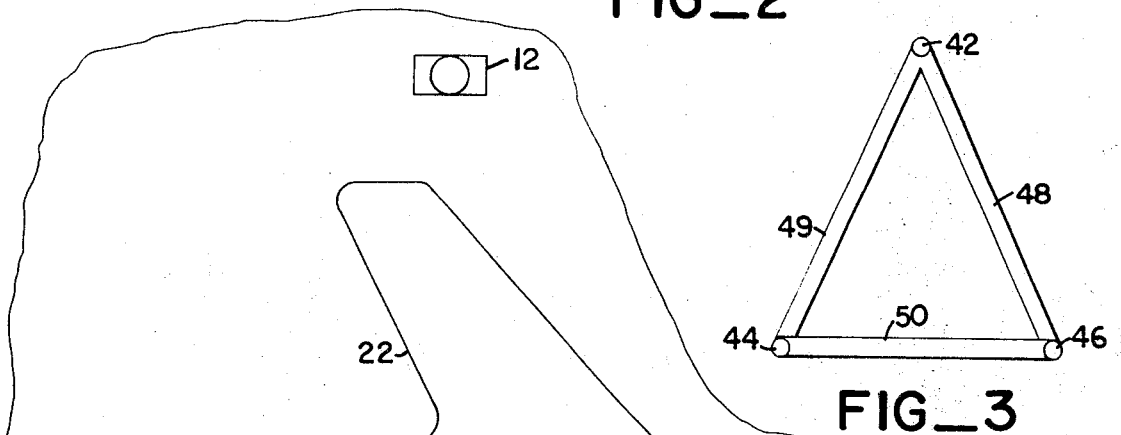
FIG_3
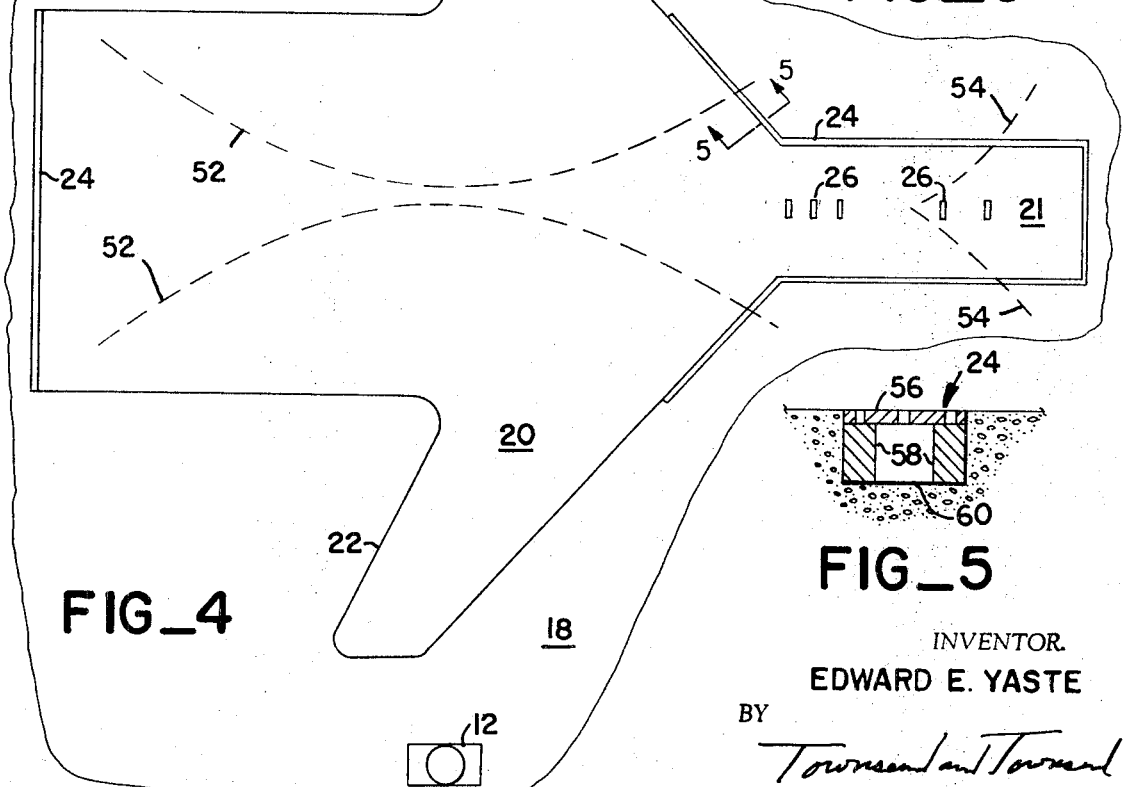
FIG_4
FIG_5
INVENTOR.
EDWARD E. YASTE
BY
Townsend and Townsend
ATTORNEYS

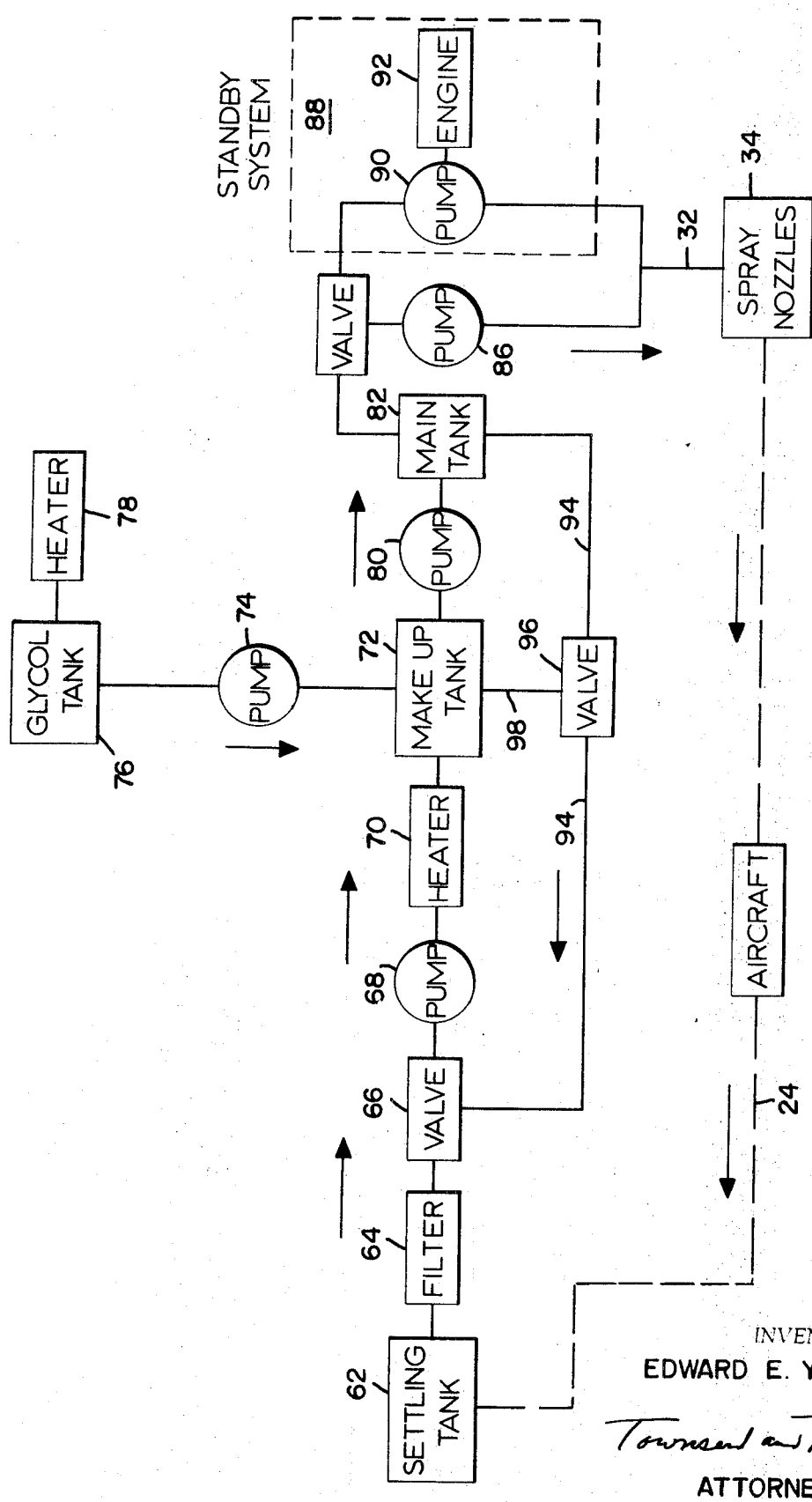

AIRCRAFT DEICER SYSTEM AND APPARATUS

This invention relates to aircraft deicers and, more particularly to an aircraft deicer structure and system for speedy and complete deicing of commercial aircraft.

During the winter months it is essential at many of the major airports of the United States and throughout the world that ice and snow be removed from aircraft preparing to takeoff. Very often the accumulation of ice on the aircraft surfaces will prevent the departure of a loaded plane and safety regulations will preclude clearing the aircraft for takeoff when icing conditions are particularly severe.

At the present time, the removal of accumulated ice and snow from the aircraft surfaces is a time-consuming job. It is usually accomplished by a large crew of men utilizing heated mixtures of deicing fluid, usually glycol, and water. These crews either spray or pour the fluid on the aircraft and then brush and scrape the ice and snow from the plane. On some airfields a mobile crane is employed with an operator carrying a hose to spray heated deicing fluid on the aircraft. This, of course, requires driving the mobile crane around the aircraft while the operator sprays the surfaces. Because of the time necessary to cover all the aircraft surfaces, ice and snow will have begun to accumulate again when the operator has returned to the point at which he started. When icing conditions are particularly severe, the usual manual methods are not satisfactory and the aircraft cannot be cleared for takeoff.

The present invention is designed to overcome the substantial problems of winter flying by providing a fixed deicing system which can cover all of the surfaces of an aircraft with a heated deicing spray thus removing ice and snow from the plane surfaces so that it may be cleared for immediate takeoff. This is accomplished in the present invention through the use of a pair of elongate booms mounted on columns located on opposite sides of an aircraft parking area. The booms are controlled so that they move synchronously in order to sweep the entire area beneath the booms. The booms are provided with power means for elevating the ends to accommodate the varying configurations of commercial aircraft. In addition, the booms are provided with pivotally mounted extension tips on the ends of the booms which may be extended to provide a larger area of spray coverage. The spray of the deicing fluid is accomplished by spray nozzles or other appropriate dispensers affixed to the booms and to their extensions.

An integral part of the invention is a recovery system for the used deicing fluid. The recovered deicing fluid is cleaned, treated, and restored to the proper glycol concentration for reuse. The system includes a series of trenches or dams around the parking area for trapping the sprayed fluid. There is also a pump and associated equipment for cleaning the recovered fluid and adding the required quantities of glycol to restore the required concentration. There is a heater for the fluid and a pump to force the heated fluid up the booms to the spray heads.

One of the major drawbacks to manual methods of deicing of aircraft is the excessive cost resulting from the spillage of the deicing fluid. If the deicing mixture is not recovered after spraying, the cost of the glycol used in the fluid is lost. Over a period of time this cost can be substantial. Thus, one of the primary advantages of the present invention is the recovery of a large proportion of the deicing fluid after it has been applied to an aircraft. Thus, the operating costs of the present system are substantially lower than the costs of manual methods. As might be expected, since only the operator is needed to control the entire spraying operation, the labor cost in operating the present invention also represents substantial savings.

Coupled with the traversing booms and the deicing fluid recovery system is a novel position control arrangement which permits accurate positioning of an aircraft in the spray area. A plurality of treadles are located in the spray area so that the nose wheel assembly of the aircraft will pass over and actuate the treadles when the plane is nearly in position. The treadles are positioned so that when the nose wheel of a particular model aircraft passes over the proper treadle, a visible signal indicates to the pilot that the aircraft is in proper position. Thus, the aircraft will be stopped in the most suitable position for spray coverage by the traversing booms.

Other features of the invention will become apparent upon reference to the accompanying drawings.

IN THE DRAWINGS

FIG. 1 is a perspective view of the overall structure showing the booms and the supplemental equipment together with an aircraft parked in position under the boom;

FIG. 2 is a side elevation of one of the booms mounted on its supporting column and showing the operator's control station and the extension boom on the end of the main boom.

FIG. 3 is a section through the main boom taken along the line 3–3 of FIG. 2;

FIG. 4 is a plan view of the aircraft parking area showing the outline of the recovery dam and trench system along the edges of the parking area and the actuating treadles for the positioning system;

FIG. 5 is a section through a recovery trench taken along the line 5–5 in FIG. 4; and FIG. 6 is a block diagram of the recovery system for the deicing fluid.

Referring now more particularly to the drawings in which the same reference numerals refer to identical parts in each of the several views, FIG. 1 shows the present invention in general detail. The apparatus comprises a pair of elongate booms 10 each of which is pivotally mounted on a support column 12. Near the outboard end of one of the booms is an operator's control station 14. The location of the operator's control station near the outboard end of one of the booms permits the operator to view the spray pattern clearly so that the most effective use of the equipment might be made. Pivotally mounted at the end of each boom is a small extension boom 16 which, in normal position, is vertical. The extension boom 16 may be moved by the operator in the control station 14 to horizontal position so that a greater arc is covered by the booms.

The support columns 12 are located on opposite edges of the aircraft parking area 18, the center of which is occupied by the aircraft parking stand 20. The parking stand comprises a paved area surrounded by a combination of raised edges or dams 22 and trenches 24 for use in trapping the deicing fluids which cascade from the aircraft being operated upon in order to lead the reclaimed fluids into the recovery system. In the center of the parking stand toward the location of the aircraft nose wheel assembly is a plurality of pressure sensitive treadles 26 at pavement level in the parking stand.

Located around the edges of the parking area is a number of light standards 28 which permit the facility to be used at night or on dark winter days.

At one side of the area 18 is a small shed 30 housing the deicing fluid recovery system and within which are located the pumps and other equipment for conveying the deicing fluid to the booms. From the pump shed 30 the heated deicing fluid is pumped underground and up through the columns 12 to be conveyed by means of pipes 32 along the booms to the spray nozzles 34. The spray nozzles 34 are strategically placed along the bottom portion of the booms.

The boom which carries the operator's control station 14 is shown in greater detail in FIG. 2. The boom 10 is pivotally mounted on a rotatable support member 35 carried by the column 12. The boom is pivoted on pivot pin 37 with a short counterweighted end 36 of the boom overhanging the supporting column 12. The elongate portion 39 of the boom extends from the support column 12 to nearly the center of the parking stand 20. The overhang of the boom from the column 12 to the end of the boom is long enough to accommodate the large commercial aircraft now in use or contemplated for the future. Since the short end 36 of the boom is counterweighted, a comparatively small hydraulic cylinder 38 connected to pivot mount 40 may be used to elevate the long portion of the boom. The rotatable support 35 permits the boom to be moved through an arc traversing the parking stand. Since the elongate end 39 of the booms may be elevated as necessary, and traversed across the parking stand, the unit may be used for any aircraft which will clear the support columns.

Each of the booms must be strong enough to support itself over its length from the support column 12 to the end of the extension boom 16. Each boom has a generally triangular cross section, as is shown in FIG. 3. The booms are made of welded pipe construction, with three transverse pipes running the length of the boom. An upper pipe 42 at the apex of the triangular shape and pipes 44 and 46 together make up the corners of the base of the triangle. Short lengths of pipe 48, 49 and 50 form the sides of the triangular cross sections, the length varying with the distance of the cross section from the pivot point at the column 12.

The extension boom 16, as is seen in FIG. 2, is normally in a vertical position so that the ends of the main booms 39 might clear each other near the point of tangency of their respective arcs. However, when the booms must be in position to spray deicing fluid on those portions of the aircraft at the greatest distance from the columns 12, the extension booms 16 extend to the horizontal position as shown by the dashed lines in FIG. 2 to permit an additional reach of 15 feet to be added to the booms 10.

The arc of traverse of the booms is shown more clearly in FIG. 4. The dashed lines 52 show the normal reach of the booms as they make a traverse of the parking stand 20. In order to be able to completely cover the nose of the aircraft with deicing fluid spray it is necessary to extend the extension booms 16 to reach the forward end 21 of the parking stand and the nose of the aircraft in position thereon. The lines 54 show the traverse of the booms when the extension booms 16 are horizontal. The raising and lowering of extension boom 16 is accomplished by hydraulic controls (not separately shown) actuated by the operator in the control station 14. Since the operator is out near the end of the boom he has a perfect view of the spray pattern and the coverage of the aircraft. He may control the traverse and elevation of the boom, and, when necessary, lower the extension boom to fully cover the aircraft with deicing spray.

The deicing fluid sprayed over the aircraft is collected within the perimeter of the parking stand for recovery. As may be seen in FIG. 4 the perimeter of the stand is defined by a combination of shallow trenches 24 and raised lips or dams 22. The deicing fluid runs into the trenches 24 to be conveyed by gravity to a settling tank 62. A typical trench 24 comprises a steel grill 56 at ground level and supported on suitable blocks 58 which define the sidewalls of the trench. The bottom 60 of the trench is lined so that the deicing fluids will flow to the settling tank.

The deicing fluid collected in the trenches, together with the water from the dissolved ice and snow from the aircraft, collects in the settling tank 62 of the recovery system shown in block form in FIG. 6. The settling tank permits any dirt or any heavy contaminants to settle out. The diluted deicing fluid may then be drawn through the filter 64 and valve 66 by pump 68. The filtered fluid is then pumped through the heater 70 and into the makeup tank 72. The heater elevates the temperature of the fluid so that hot deicing fluid will be supplied to the spray nozzles 34. The makeup tank is supplied with the diluted deicing fluid and with glycol from the tank 76 by pump 74. The glycol is kept at an elevated temperature by heater 78. Since the deicing fluid from the settling tank has been diluted by the melted ice and snow, glycol is added in order to restore the proper proportion of glycol to water. This may be accomplished automatically by means of sensing devices in the makeup tank to control the pump 74. This may also be done by manual control of the pump 74.

From the makeup tank the deicing fluid having the proper proportions of glycol and water is pumped by pump 80 into the main supply tank 82. The main supply tank 82 supplies the deicing fluid for the spray nozzles 34. The deicing fluid is taken through valve 84 by the pump 86 to be sent through the supply pipe 32 to the nozzles. In order to make certain that the system will always have the capacity to supply deicing fluid out to the booms for spraying on the aircraft a standby system 88 is utilized comprising a standby pump 90 in parallel with the main pump 86. The standby pump 90 is powered by a supplemental engine 92 so that the system is independent of the airport power system. The fluid supply in the main tank 82 is maintained at the proper temperature by circulating deicing fluid from the main tank through supply pipe 94 and valve 96 into valve 88 from whence the fluid is pumped through the heater 70. A short bypass 98 from the makeup tank is also connected to the valve 96 to permit circulation of the makeup fluid through the heater.

I claim:

1. Aircraft deicing apparatus comprising: an aircraft parking area; a pair of support members adjacent the parking area on opposite sides thereof; a pair of elongate booms rotatably and pivotably mounted near their ends on the support members, means to traverse the booms in synchronism along approximately tangent arcuate paths over the parking area, means to elevate the outboard ends of the booms at any point along the arcuate paths, a control station carried on one of the booms providing an operator in the station with a substantially unobstructed view of an aircraft in the parking area; and a deicing spray system, including a plurality of fluid spray means mounted on the booms in a predetermined pattern, means for delivering deicing fluid to the spray means, and means for collecting the sprayed fluid for recirculation in the spray system.

2. Apparatus for spraying fluid over substantially an entire aircraft comprising: a first elongate boom pivotally mounted near one end thereof on a support structure, said boom movable along a horizontal arc from a first position to a second position, a second elongate boom pivotally mounted near one end thereof on a support structure opposite the first boom, said boom movable along a horizontal arc from a first position to a second position, an operator's control station carried on the first boom adjacent the outboard end of the boom away from the support structure, means for moving the first boom and the second boom along their respective arcs in synchronism; means for elevating the outboard ends of the booms in synchronism, a plurality of fluid spray means mounted on the booms for spraying an aircraft parked between the boom support structures; means for conveying fluid to the spray means on the booms; means for collecting the fluid which has been sprayed on the aircraft so that the fluid may be cleaned and recirculated to the spray means; and means in the control station for controlling movement of the booms and for controlling the fluid spray means.

3. The apparatus of claim 2 and wherein each elongate boom has a second boom mounted at the outboard thereof; means for pivoting each second boom from a first substantially vertical position to a second position aligned with the elongate boom on which it is mounted; and spray means on each second boom for increasing the spray area covered by the elongate boom sprays when the second booms are aligned with the elongate booms.

4. The apparatus of claim 2 and including means for detecting the position of an aircraft between the support structures, said detecting means including means to actuate a signal when the aircraft is in the optimum position relative to maximum coverage of the spray pattern.

5. The apparatus of claim 2 wherein there is included a deicing fluid recovery system for recovering a spray mixture of water and glycol comprising: container means for receiving the collected deicing fluid and holding the fluid so that heavy contaminants may settle out; filter means for removing a substantial portion of any particulate matter carried by the fluid removed from said container means, means for determining the proportion of water and glycol in the recovered fluid; means for supplying additional glycol to the deicing fluid to bring the glycol to the desired proportion of the deicing fluid, and means for heating the deicing fluid.